United States Patent
Pillai

(10) Patent No.: US 7,482,926 B2
(45) Date of Patent: Jan. 27, 2009

(54) SYSTEM AND METHOD OF ENHANCING RANGE IN A RADIO FREQUENCY IDENTIFICATION SYSTEM

(75) Inventor: Vijay Pillai, Mukilteo, WA (US)

(73) Assignee: Intermec IP Corp., Everett, WA (US)

( * ) Notice: Subject to any disclaimer, the term of this patent is extended or adjusted under 35 U.S.C. 154(b) by 188 days.

(21) Appl. No.: 11/261,945

(22) Filed: Oct. 28, 2005

(65) Prior Publication Data
US 2007/0096881 A1 May 3, 2007

(51) Int. Cl.
G08B 13/14 (2006.01)
(52) U.S. Cl. ............... 340/572.1; 340/572.7; 340/539.1; 340/825.69; 340/10.1; 340/10.3; 340/10.34; 340/10.51
(58) Field of Classification Search ............... 340/572.1, 340/572.4, 539.1, 568.1, 825.69, 825.72, 340/10.1, 10.3, 10.32, 10.34, 572.3, 572.7, 340/10.51; 343/846, 848, 850; 342/42, 125
See application file for complete search history.

(56) References Cited

U.S. PATENT DOCUMENTS

| | | | |
|---|---|---|---|
| 4,196,418 A | 4/1980 | Kip et al. ..................... 340/152 |
| 4,566,009 A | 1/1986 | Hanni et al. .................. 343/6.5 |
| 4,850,036 A | 7/1989 | Smith ......................... 455/179 |
| 5,109,217 A | 4/1992 | Siikarla et al. ............... 340/572 |
| 5,119,104 A | 6/1992 | Heller ......................... 342/450 |
| 5,266,926 A | 11/1993 | Beigel ......................... 340/572 |
| 5,305,008 A | 4/1994 | Turner et al. .................. 342/44 |
| 5,349,332 A | 9/1994 | Ferguson et al. ............. 340/572 |
| 5,377,222 A | 12/1994 | Sanderford, Jr. ................ 375/1 |
| 5,394,433 A | 2/1995 | Bantz et al. .................. 372/202 |
| 5,438,332 A | 8/1995 | Adam et al. ................... 342/45 |
| 5,446,769 A | 8/1995 | Shaver et al. ................. 375/202 |
| 5,459,759 A | 10/1995 | Schilling ..................... 375/202 |
| 5,471,469 A | 11/1995 | Flammer, III et al. ......... 370/94.1 |

(Continued)

FOREIGN PATENT DOCUMENTS

WO 2004/090783 10/2004

OTHER PUBLICATIONS

Glidden, R., et al., "Design of Ultra-Low Cost UHF RFID Tags for Supply Chain Applications," IEEE Communications Magazine, Aug. 2004, pp. 140-151.

(Continued)

Primary Examiner—Hung T. Nguyen
(74) Attorney, Agent, or Firm—Seed IP Law Group PLLC

(57) ABSTRACT

A radio frequency identification (RFID) system includes a plurality of RFID tags each having adjustable tag resonant frequency, and an RFID reader configured to transmit interrogation and change frequency RF signals. The interrogation and change frequency RF signals are transmitted at the current tag resonant frequency. The plurality of RFID tags modify the tag resonant frequency to a new tag resonant frequency in response to the change frequency RF signals. RFID tag identification rates may be enhanced by interrogating the plurality of RFID tags at the tag resonant frequency for a dwell time, receiving response RF signals, determining a new tag resonant frequency, and transmitting a change frequency RF signal that causes the RFID tags to change the tag resonant frequency to the new tag resonant frequency. The new resonant frequency may be based on the number of received responses.

22 Claims, 7 Drawing Sheets

U.S. PATENT DOCUMENTS

| | | | |
|---|---|---|---|
| 5,495,229 A | 2/1996 | Balch et al. | 340/551 |
| 5,533,025 A | 7/1996 | Fleek et al. | 370/85.2 |
| 5,689,239 A | 11/1997 | Turner et al. | 340/572 |
| 5,731,691 A | 3/1998 | Noto | 323/220 |
| 5,793,305 A | 8/1998 | Turner et al. | 340/825.54 |
| 5,828,693 A | 10/1998 | Mays et al. | 375/202 |
| 5,850,181 A | 12/1998 | Heinrich et al. | 340/572 |
| 5,862,438 A | 1/1999 | Folkins | 399/88 |
| 6,011,488 A | 1/2000 | Busser | 340/825.54 |
| 6,040,773 A | 3/2000 | Vega et al. | 340/572.1 |
| 6,054,925 A | 4/2000 | Proctor et al. | 340/572.7 |
| 6,140,924 A | 10/2000 | Chia et al. | 340/572.5 |
| 6,400,274 B1 | 6/2002 | Duan et al. | 340/572.7 |
| 6,429,775 B1 | 8/2002 | Martinez et al. | 340/572.1 |
| 6,434,183 B1 | 8/2002 | Kockmann et al. | 375/132 |
| 6,486,769 B1 | 11/2002 | McLean | 340/10.32 |
| 6,812,841 B2 | 11/2004 | Heinrich et al. | 340/572.1 |
| 6,862,438 B2 | 3/2005 | Darabi | 455/226.3 |
| 6,967,934 B1 | 11/2005 | Kockmann et al. | 370/280 |
| 7,068,224 B2 * | 6/2006 | Carrender et al. | 343/700 MS |
| 7,103,087 B2 | 9/2006 | Eastburn | 375/132 |
| 7,215,248 B2 | 5/2007 | Heinrich et al. | 340/572.1 |
| 2002/0122405 A1 | 9/2002 | Liang | 370/344 |
| 2002/0186749 A1 | 12/2002 | Jones | 375/132 |
| 2003/0017804 A1 | 1/2003 | Heinrich et al. | 455/41 |
| 2003/0189638 A1 | 10/2003 | Fry | 348/154 |
| 2004/0036595 A1 | 2/2004 | Kenny et al. | 340/505 |
| 2005/0141562 A1 | 6/2005 | Chen et al. | 370/480 |
| 2005/0179521 A1 | 8/2005 | Pillai et al. | 340/10.34 |

OTHER PUBLICATIONS

Karthaus, U., et al., "Fully Integrated Passive UHF RFID Transponder IC With 16.7µ W Minimum RF Input Power," IEEE Journal of Solid-State Circuits, vol. 38, No. 10, Oct. 2003, pp. 1602-1608.

Masui, S., et al., "A 13.56MHz CMOS RF Identification Transponder Integrated Circuit with a Dedicated CPU," IEEE International Solid-State Circuits Conference, 1999, pp. 162-163.

Pillai, V., et al., "An Ultra Low Power Long Range Battery/Passive RFID Tag for UHF and Microwave Bands with a Current Consumption of 700nA at 1.5V," pp. 1-44, 2004.

Rao, K., et al., "On the Analysis and Design of High-Performance RFID Tags," Third Workshop on Automatic Identification Advanced Technologies, Tarrytown, NY, Mar. 2002, 2 pages.

De Vita, G., et al, "Design Criteria for the RF Section of Long Range Passive RFID Systems," IEEE, 2004, pp. 107-110.

Wu, S., et al., "A Transponder IC for Wireless Identification Systems," Personal, Indoor, and Mobile Radio Communications, 1996. PIMRC'96, Seventh IEEE International Symposium, vol. 1, Oct. 15-18, 1996, pp. 238-241.

Zuta, M., "A New PLL With Fast Settling Time and Low Phase Noise," Microwave Journal, vol. 41, No. 6, Jun. 1998, pp. 94-108.

U.S. Appl. No. 09/211,584, filed Dec. 14, 1998, Heinrich et al.

* cited by examiner

SYSTEM AND METHOD OF ENHANCING RANGE IN A RADIO FREQUENCY IDENTIFICATION SYSTEM

BACKGROUND OF THE INVENTION

1. Field of the Invention

The present disclosure relates to radio frequency identification (RFID) systems, and more particularly to systems and methods of enhancing range in RFID systems.

2. Description of the Related Art

FIG. 1 illustrates a conventional RFID system 100. The RFID system 100 typically includes an RFID reader 110 and one or more RFID tags 120 (only one illustrated) that wirelessly communicate with the RFID reader 110.

Typically, the RFID tag 120 includes an antenna 122, a front end 124, and a signal processing/memory block 126. The RFID tag 120 may be passive, deriving power from an interrogation radio frequency (RF) signal sent by the RFID reader 110. In particular, the front end 124 may include rectifying circuitry for converting the AC power of the interrogation RF signal to DC power for supplying power to the signal processing/memory block 126. Alternatively, the RFID tag 102 may be active, carrying a discrete power source, for example a battery.

The RFID system 100 may operate in several government-regulated radio frequency bands, including a high frequency band (13.56 MHz), an ultra-high frequency band (860-915 MHz), and/or a microwave band (2.4 GHz). A conventional RFID tag 120 is tuned to a certain fixed resonant frequency. The resonant frequency depends upon the impedance of the RFID tag 120, and is a combination of the impedances of the antenna 122, the front end 124, and the signal processing/memory block 126. The resonant frequency is that frequency at which the interrogation RF signal from the RFID reader 110, for example, causes the largest electrical response in the RFID tag 120, and at which the response RF signal generated by the RFID tag 120 has the greatest range.

FIG. 2 illustrates a range of the response RF signal generated by conventional RFID tags, also referred to as the range of the RFID tag, as a function of frequency of the response RF signal. A curve labeled High Q illustrates the range of a highly tuned, high quality-factor (Q-factor) RFID tag (i.e., an RFID tag with highly tuned circuitry), and a curve labeled Low Q illustrates the range of an RFID tag with a low Q-factor. The range is maximum when the response RF signal is generated at the tag resonant frequency $f_R$, and the range rolls-off for frequencies increasingly smaller or larger than $f_R$. Typically, the maximum range and rate of roll-off with frequency is dependent upon the Q-factor of the tag 120.

The Federal Communications Commission (FCC) mandates that RFID systems operate in designated frequency bands. For example, if the RFID system operates in the 915 MHz band, then the RFID system is required to operate in a specified bandwidth (e.g., 30 MHz) centered about 915 MHz. Therefore, RFID tags designated to operate in the 915 MHz band are typically manufactured to have a fixed resonant frequency of 915 MHz. That is, the RFID tags will have a maximum range when generating response RF signals having a carrier frequency of 915 MHz. In addition, the RFID tags will have a maximum electrical response when queried by interrogation RF signals having a carrier frequency of 915 MHz. However, in order to allow all users access to the band with minimum interference, the FCC also mandates that an RFID system cannot operate at a single frequency for an indefinite period of time. In other words, the RFID system is required to hop to other frequencies in the specified bandwidth. For example, within a period of 4 seconds the RFID system (i.e., RFID reader 110 and RFID tag 120) may be required to operate at thirty different frequencies in a 30 MHz bandwidth. This hopping causes the range of the RFID tags to decrease as the RFID tags operate at off-resonant frequencies, thereby degrading system performance (e.g., rate of tag identification).

When an RFID system communicates at the resonant frequency of the RFID tags, such as frequency $f_R$ (FIG. 2), a population of high Q-factor RFID tags is desirable since tag identification rates will be higher than a system populated with low Q-factor tags. However, a population of tags with lower Q-factors may be desirable when the RFID system operates at some off-resonant frequencies, since the tag ranges of low Q-factor tags operating at some off-resonant frequencies are larger than high Q-factor tags operating at the same off-resonant frequencies. It would be desirable to have a system and method of maximizing tag range and tag identification, thereby increasing system efficiency, increasing tag identification rates, and decreasing system latency.

BRIEF SUMMARY OF THE INVENTION

In one embodiment, a radio frequency identification reader operable to communicate with RFID tags includes a reader antenna; a variable radio frequency source operable to generate carrier waves at a plurality of carrier wave frequencies; a controller operable to from time-to-time, determine a new carrier wave frequency, the new carrier wave frequency being different from a current carrier wave frequency that at least approximately matches a current tag resonant frequency of at least one of the RFID tags, and generate change frequency instructions indicative of an instruction to change a tag resonant frequency from the current tag resonant frequency to at least approximately match a new tag resonant frequency; and a transmitter configured to modulate the carrier waves having the current carrier wave frequency with the change frequency instructions to transmit a change frequency radio frequency signal via the reader antenna. The RFID reader may further include a receiver to receive radio frequency response signals transmitted by the plurality of radio frequency identification tags. The controller may determine the new carrier wave frequency based upon the received response RF signals. The controller may estimate an RFID tag population based upon a number of the received response RF signals and determine the new carrier wave frequency based upon the estimated RFID tag population.

In another embodiment, a radio frequency identification tag operable to communicate with a radio frequency identification reader includes an adjustable impedance block; and a signal processing/memory section coupled to the adjustable impedance block and configured to receive a change frequency radio frequency signal from the radio frequency identification reader and to change a tag resonant frequency to a new tag resonant frequency by modifying an impedance of the adjustable impedance block in response to the change frequency radio frequency signal. The adjustable impedance block may include at least two capacitors and at least one switch operable to selectively electrically couple at least one of the capacitors across first and the second antenna lines of the antenna.

In yet another embodiment, an RFID tag operable to communicate with a radio frequency identification reader includes radio frequency signal receiving means for receiving a radio frequency signal from the radio frequency identification reader; signal processing means for determining whether the received radio frequency signal is an instruction to change a tag resonant frequency of the radio frequency identification tag; and tag resonant frequency changing means for changing a tag resonant frequency to a new tag resonant frequency in response to the signal processing means determining that the received radio frequency signal is an instruction to change the tag resonant frequency of the radio frequency identification tag.

In still another embodiment, a radio frequency identification system includes a plurality of radio frequency identification tags each having a tag resonant frequency that is adjustable and configured to wirelessly communicate at a current tag resonant frequency; and a radio frequency identification reader operable to transmit interrogation radio frequency signals and change frequency radio frequency signals, the interrogation radio frequency signals and the change frequency radio frequency signal being transmitted at the current tag resonant frequency, and the plurality of radio frequency identification tags further configured to modify the tag resonant frequency to a new tag resonant frequency based upon the receipt of change frequency radio frequency signals.

In a further embodiment, a method of operating a radio frequency identification reader to enhance radio frequency identification tag identification rates for a plurality of radio frequency identification tags operating at a variable tag resonant frequency includes interrogating the plurality of radio frequency identification tags at a current tag resonant frequency for a dwell time; receiving response radio frequency signals transmitted by the plurality of radio frequency identification tags at the tag resonant frequency during the dwell time; determining a new tag resonant frequency at which the radio frequency identification tags and the radio frequency identification reader will communicate; and transmitting a change frequency radio frequency signal for instructing the radio frequency identification tags to change the tag resonant frequency to the new tag resonant frequency.

In still a further embodiment, a, method of operating a radio frequency identification tag in communication with a radio frequency identification reader to enhance radio frequency identification tag identification rates includes receiving a radio frequency signal from the radio frequency identification reader; determining whether the received radio frequency signal is an instruction to change a tag resonant frequency of the radio frequency identification tag; and changing a tag resonant frequency to a new tag resonant frequency in response to determining that the received radio frequency signal is an instruction to change the tag resonant frequency of the radio frequency identification tag.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with RFID readers and/or RFID tags, including transmitters, receivers, and/or transceivers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the embodiments.

Figure 1:
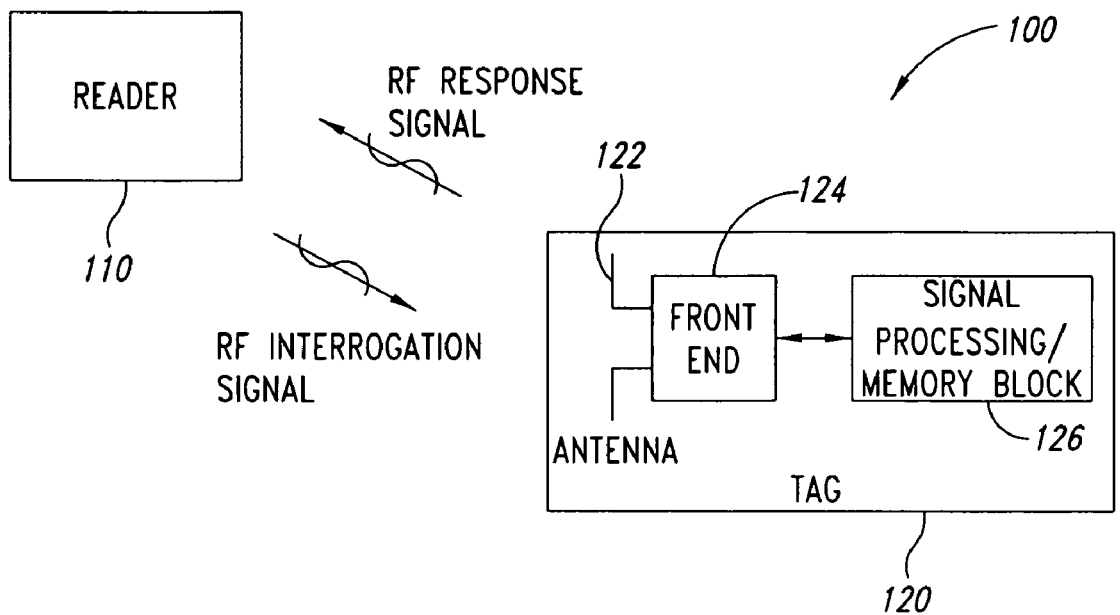
FIG. 1 is a schematic diagram of a conventional radio frequency identification (RFID) system including an RFID reader and RFID tag.
Figure 2:
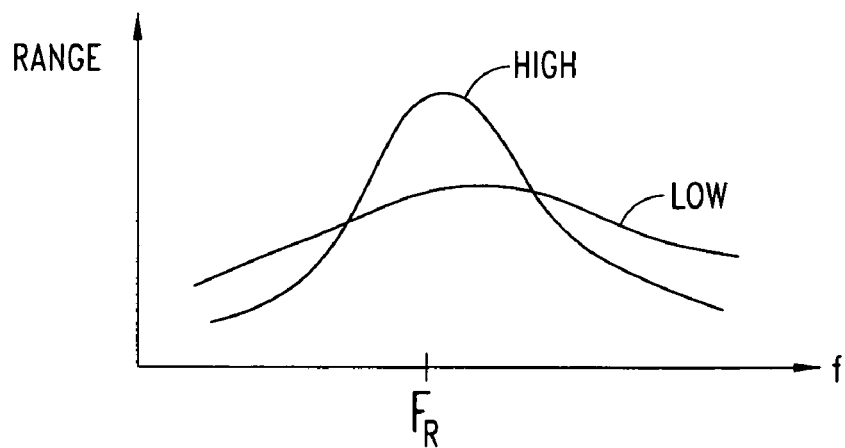
FIG. 2 is a graph showing an RF tag range of the RFID tag of FIG. 1.
Figure 3:
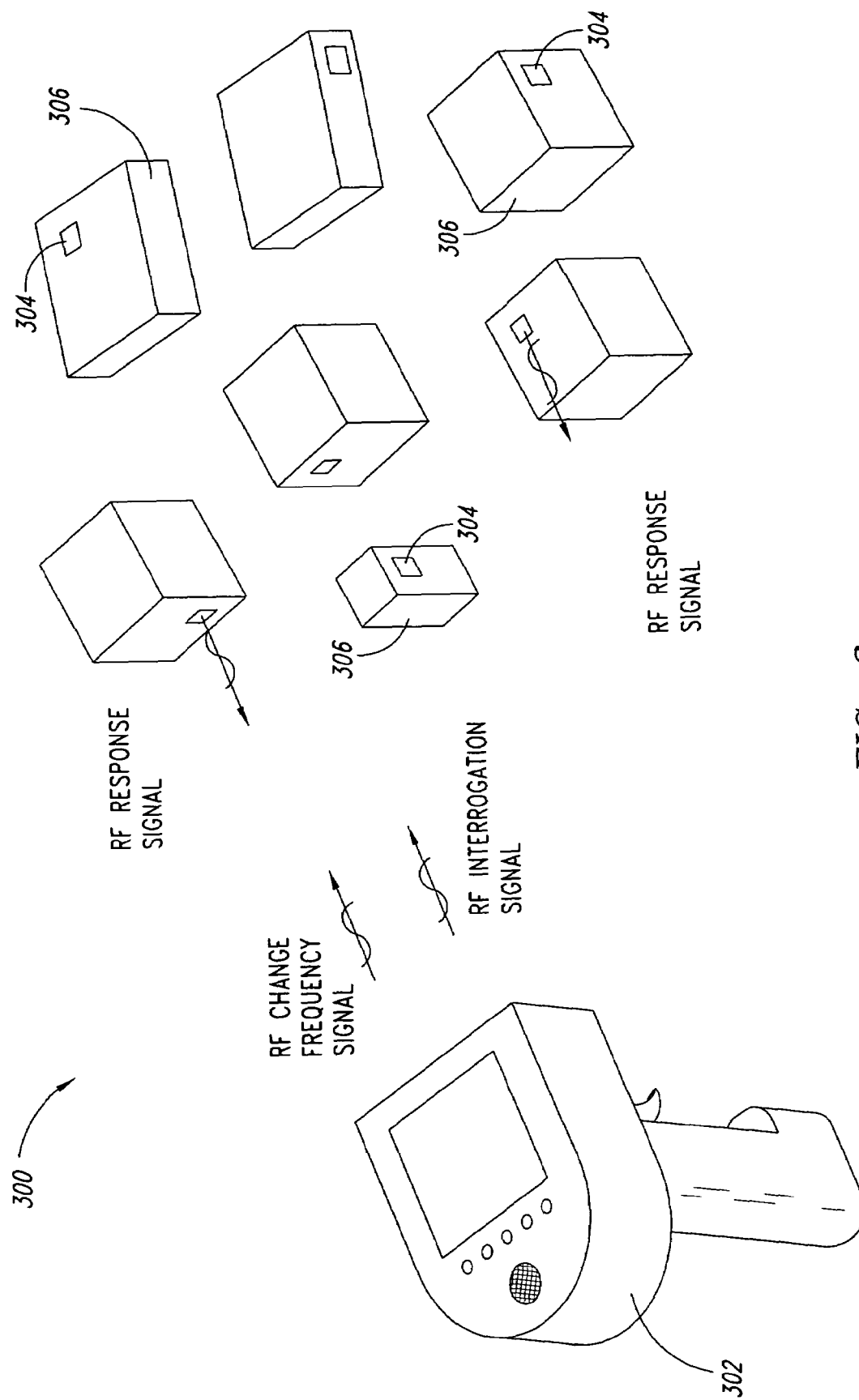
FIG. 3 is a perspective view of an RFID system including an RFID reader and a plurality of RFID tags, according to one illustrated embodiment of the present invention.

FIG. 3 shows a radio frequency identification (RFID) system 300, according to one illustrated embodiment of the present invention. The RFID system 300 includes at least one RFID reader 302, also referred to as an RFID interrogator, and a population of RFID tags 304.

The RFID tags 304 may take the form of simple transponders operable to read data from memory and transmit the same in response to an interrogation RF signal, or may include circuitry for performing more complicated functions such as logic operations, encryption, authentication and/or writing to memory. While the RFID tags 304 are illustrated attached to shipping containers 306, one of skill in the art will appreciate that the RFID system 300 may include RFID tags 304 attached to any type of product, machine, or composition of matter, and/or may include RFID tags 304 unattached to any objects. For example, an RFID tag 304 may be attached to vehicles for implementation of an automated toll-collection system, to merchandise in a retail store for automated check out, security and/or inventory tracking and assessment, or any manufactured product for tracking during manufacturing and/or shipping.

A user may control the RFID reader 302 to query or interrogate the population of RFID tags 304. Alternatively, the RFID reader 302 may be automatically controlled to query or interrogate the population of RFID tags 304. The RFID reader 302 transmits wireless signals such as electromagnetic or reader radio frequency (RF) signals which may be received by one or more of the RFID tags 304 within the range of the RFID reader 302. The transmissions may be broadcasts directed to all RFID tags 304 within the range of the RFID reader 302. Alternatively, the transmissions may be pointcasts directed or addressed to one or a number of select RFID tags 304 within the range of the RFID reader 302. The reader RF signals may be modulated to carry data, instructions and/or commands. In particular, as described in more detail below, the RFID reader 302 may transmit interrogation RF signals and change frequency RF signals.

If the RFID tag 304 is a passive device (i.e., powered by the interrogation RF signal received from the RFID reader 302), then the RFID tag 304 modulates a backscattered signal. More specifically, in order to respond to a particular query from the RFID reader 302, the RFID tag 304 retrieves data stored in memory (not shown in FIG. 3), and uses the data to modulate an impedance mismatch discussed further below in conjunction with FIG. 5. The RFID tag 304 thereby conveys information to the RFID reader 302 via a modulated backscattered response RF signal. If the RFID tag 304 is an active device (i.e., RFID tag circuitry is powered by an on-tag power source), the RFID tag 304 generates a carrier wave, and modulates the carrier wave with data retrieved from memory to produce the response RF signal.

As the RFID reader 302 identifies RFID tags 304 via the response RF signals, the RFID reader 302 typically transmits "stop communication" command signals that instruct the identified RFID tags 304 to discontinue communication with the RFID reader 302. Thus, as RFID tags 304 are identified, the population of unidentified RFID tags 304 typically decreases. However, the RFID tag population is not necessarily static. For example, new RFID tags may move into range of the RFID reader 302, or some of the unidentified RFID tags 304 may move out of range of the RFID reader 302. Thus, even as the RFID reader 302 identifies some of the RFID tags 304, the population of unidentified RFID tags may increase.

Figure 4:
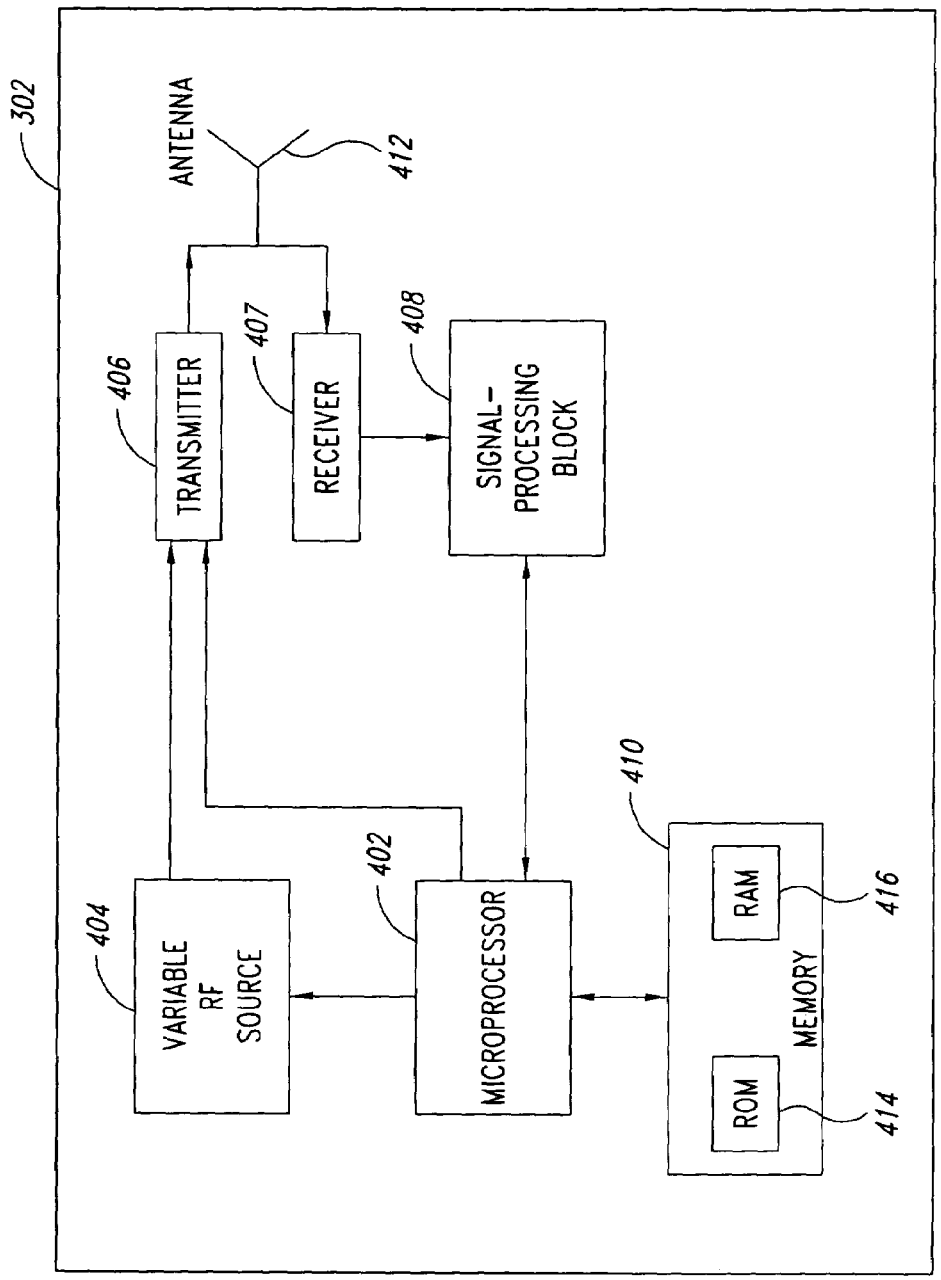
FIG. 4 is a block diagram of the RFID reader according to one illustrated embodiment.

FIG. 4 is a block diagram of the RFID reader 302 of FIG. 3 according to one illustrated embodiment.

The RFID reader 302 illustrated in FIG. 4 includes a controller in the form of a microprocessor 402, a variable radio frequency (RF) source 404, a transmitter 406, a receiver 407, a signal-processing block 408, a memory 410, and an antenna 412. The controller may take a variety of other forms, for example a digital signal processor (DSP) and/or application specific integrated circuit (ASIC). The memory preferably includes a read-only memory (ROM) 414 and a random access memory (RAM) 416. The RFID reader 302 may include a number of conventional components, such as those disclosed in U.S. Pat. Nos. 5,828,693 and 5,850,181. As is appreciated by one of skill in the art, the RFID reader 302 may include a different combination or interconnection of the illustrated components, may not include all the illustrated components, or may include additional components such as disclosed in U.S. Pat. Nos. 5,828,693 and 5,850,181.

The microprocessor 402 sends a control signal to the variable RF source 404 instructing the variable RF source 404 to generate a carrier wave having a specified frequency (also referred to as a carrier frequency) within an FCC-regulated bandwidth. The variable RF source 404 may be implemented as a voltage-controlled oscillator for generating the carrier wave. In one embodiment the controller, such as the microprocessor 402, includes a device such as an electric programmable logic device (EPLD). The EPLD may, for example, generate pseudo-random codes for driving the voltage-controlled oscillator. Alternatively, the variable RF source 404 may be provided by a plurality of frequency generators for generating carrier waves of different frequencies. The transmitter 406 receives the carrier wave having the specified carrier frequency. The transmitter 406 may include an amplifier and a modulator. The receiver 407 may include a demodulator and/or amplifier. In another embodiment, the transmitter 406 and the receiver 407 may be provided by as transceiver. Transceivers are well known in the art. For example, a transceiver may include an amplifier, a modulator, and a demodulator.

In one embodiment of operation, the transmitter 406 receives the carrier wave at the specified carrier frequency, amplifies the carrier wave, modulates the amplified carrier wave with an instruction, command, or data signal received from the microprocessor 402 and/or memory 410, and transmits the modulated carrier wave of the specified frequency to the tag population 304 via the antenna 412. For example, the RFID reader 302 may modulate the amplified carrier wave with change frequency instructions to generate a change frequency RF signal, and transmit the change frequency RF signal to the tag population. The RFID reader 302 may also modulate the amplified carrier wave with query or interrogation commands to generate an interrogation RF signal, and transmit the interrogation RF signal to the RFID tag population.

Alternatively, transmitter 406 receives the carrier wave having the specified frequency, amplifies the carrier wave, and transmits the amplified carrier wave of the specified frequency to the tag population 304 via the antenna 412. For example, if the RFID reader 302 is used only to convey power to the RFID tags 304, and not otherwise communicate with the tag population, the transmitter 406 may not modulate the carrier wave. Upon initialization of the RFID system 300, the specified frequency of the carrier wave is the same as a resonant frequency of the RFID tags 304. The modulated carrier waves (i.e., interrogation RF signals and change frequency RF signals) may carry embedded information, including data and RFID tag commands, instructing the RFID tags 304 to perform an action, such as changing resonant frequency or generating a response RF signal. The response RF signals transmitted by the RFID tags 304 may convey information, such as object identifiers, for example.

When an RFID tag 304 responds to the interrogation RF signal by transmitting a response RF signal (e.g., a modulated backscattered signal), the receiver 407 receives the response RF signal via the antenna 412, demodulates the response RF signal, and sends the demodulated response RF signal to the signal-processing block 408. As is well appreciated to one of skill in the art, the signal-processing block 408 employs conventional means to decode the digital information embedded in the demodulated response signal. The signal-processing block 408 may decode the demodulated response signal in conjunction with the controller, for example microprocessor 402. The digital information conveyed by the RFID tags 304 may, for example include: an object identification number, date of purchase, price of object, name of purchaser, name of manufacturer, tag location, tax information and/or other data. The RFID reader 302 may store the digital information in memory 410. In addition, the microprocessor 402 may access the digital information stored in memory 410, along with instructions stored in ROM 414, to determine the next RF carrier wave frequency and/or a dwell time between frequency hops, and generate change frequency instructions, for example.

For example, based upon an FCC-set upper limit on total interrogation RF signal energy radiated by the RFID reader 302 at a single frequency, dwell time limitations, the number or types of received response RF signals from the tag population, or the pseudo-random codes generated by the microprocessor 402, the microprocessor 402 may decide to hop to a new carrier frequency. The microprocessor 402 retrieves change frequency instructions from the memory 410, or otherwise generates the change frequency instructions, and sends the instructions to the transmitter 406. The change frequency instructions may include the new carrier frequency. The change frequency instructions selected from the memory 410 may be one of many change frequency instructions stored in the memory 410.

A method of selecting the next carrier frequency will be discussed in more detail below in conjunction with FIG. 8. The transmitter 406 modulates the carrier wave at the specified frequency with the change frequency instructions, and sends the modulated carrier wave (i.e., the change frequency RF signal) to the RFID tag population instructing the RFID tag population to change their resonant frequency to the new carrier frequency. That is, the RFID tags 304 receive and decode the change frequency RF signal to extract the new carrier frequency. A means by which the RFID tags 304 change their resonant frequency will be discussed more fully below in conjunction with FIGS. 5-6. Once the RFID tags 304 change their resonant frequency to the new carrier frequency (also referred to as a new tag resonant frequency), the RFID tags 304 and the RFID reader 302 communicate at the new tag resonant frequency until the RFID reader 302 instructs the RFID tags 304 to change their tag resonant frequency to yet another new tag resonant frequency.

Figure 5:
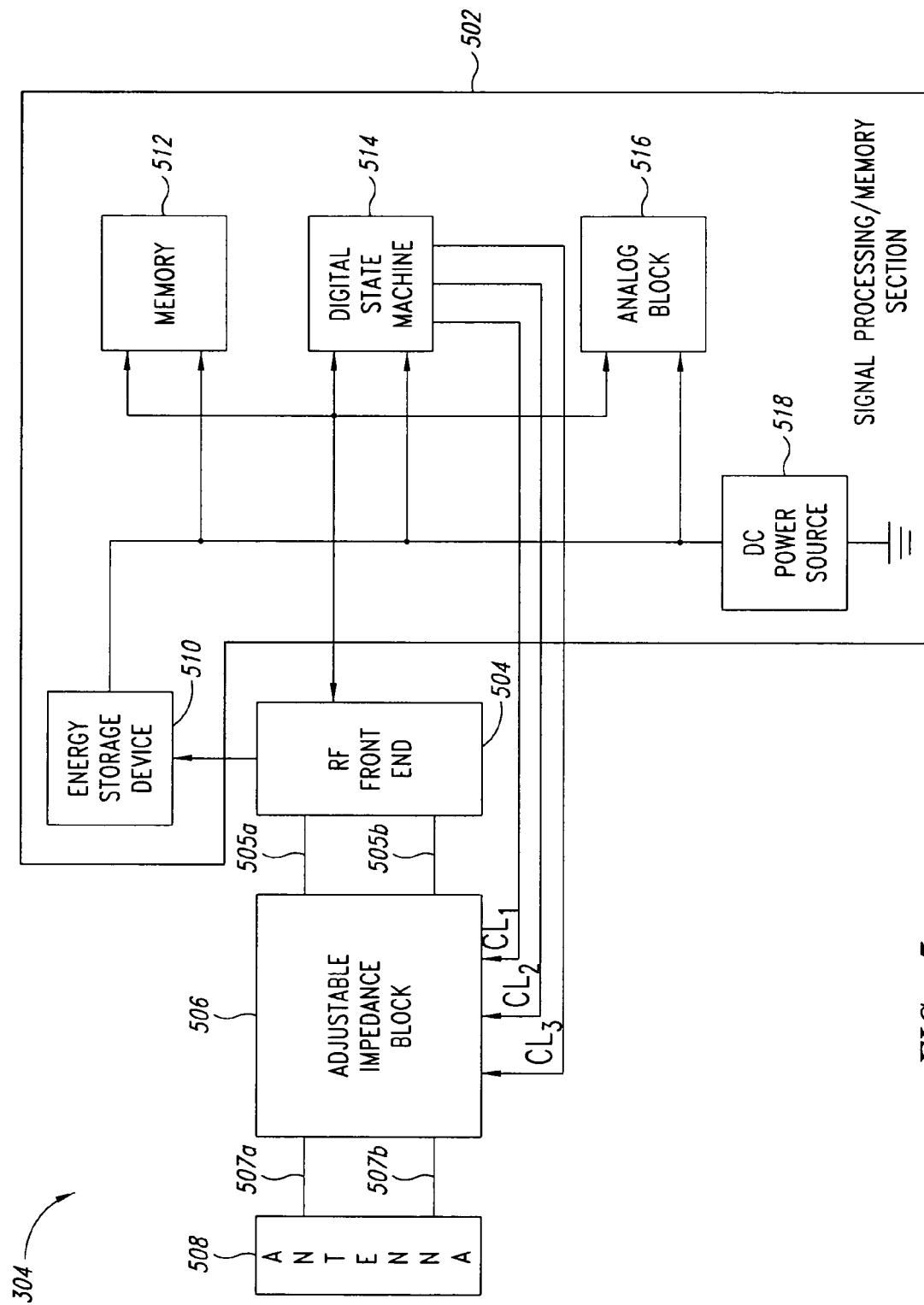
FIG. 5 is block diagram of the RFID tag according to one illustrated embodiment.

FIG. 5 is block diagram of the RFID tag 304 of FIG. 3, according to one illustrated embodiment. The exemplary RFID tag 304 includes a signal processing/memory section 502, an RF front end 504, an adjustable impedance block 506 and an antenna 508. The signal processing/memory section 502 includes a memory 512, a digital state machine 514, and an analog block 516. The signal processing/memory section 502 may also include an energy storage device 510 and a DC power source 518, however in an alternate embodiments the RFID tag 304 does not include the DC power source 518 and/or the energy storage device 510. Alternatively, the energy storage device 510 may be incorporated in the RF front end 504.

The antenna 508 is coupled to the adjustable impedance block 506 via lines 507a and 507a. The antenna 508 may comprise a dipole element, but it should be appreciated that other types of antennas could also be advantageously utilized, such as a folded dipole, a meander dipole, a dipole over ground plane, a patch, and the like. The adjustable impedance block 506 is coupled to the RF front end 504 via lines 505a and 505a and to the signal processing/memory section 502 via control lines $CL_1$, $CL_2$ and $CL_3$. Although three exemplary control lines are illustrated, the scope of the present invention covers any number of control lines. As will be discussed further below in conjunction with FIG. 6, the digital state machine 514 controls an impedance of the adjustable impedance block 506 via control signals transmitted on the control lines $CL_1$, $CL_2$ and $CL_3$ in response to a change frequency RF signal received from the RFID reader 302. The change frequency RF signal may comprise change frequency instructions and/or a new tag resonant frequency.

The RF front end 504 may include an RF receiver that recovers analog signals (e.g., the interrogation RF signals and the change frequency RF signals, collectively referred to as reader RF signals) that are transmitted by the RFID reader 302 (FIG. 3). The RF front end 504 may also include an RF transmitter that sends response RF signals (also referred to as tag data signals or tag signals) back to the RFID reader 302. The RF transmitter may further comprise a modulator adapted to backscatter modulate the impedance mismatch with the antenna 508 in order to transmit data signals by reflecting the interrogation RF signal provided by the RFID reader 302. The RF front end 504 may also include rectifying circuitry. The rectifying circuitry may include Schottky diodes. The rectifying circuitry operates to rectify the interrogation RF signal received from the adjustable impedance block 506, and uses the rectified signal to charge the energy storage device 510. In one embodiment, the energy storage device 510 is a power capacitor. The energy storage device 510 serves as a power source for the memory 512, the digital state machine 514, and the analog block 516.

The optional DC power source 518 may include a battery and a Schottky diode. In one embodiment, if a voltage output of the energy storage device 510 falls below a predefined level, then the DC power source 518 supplies power to the memory 512, the digital state machine 514, and the analog block 516. In another embodiment, the energy storage device 510 is charged by either the rectified interrogation RF signal received from the RF front end 504, or the DC power source 518 when the RFID tag 304 is not receiving an interrogation RF signal. Consequently, only the energy storage device 510 provides power to the memory 512, the digital state machine 514, and the analog block 516.

As an exemplary embodiment, the analog block 516 converts analog data signals recovered by the RF front end 504 from the reader RF signals into digital signals comprising the received commands, recovers a clock from the received analog signals, and converts digital data retrieved from the memory 512 into analog signals that are backscatter modulated by the RF front end 504. The digital state machine 514 provides logic that controls the functions of the RFID tag 304 in response to commands provided by the RFID reader 302 that are embedded in the recovered reader RF signals. The digital state machine 514 accesses the memory 512 to read data therefrom and/or write data thereto. The memory 512 may be provided by an EEPROM or like nonvolatile semiconductor memory device capable of maintaining a stored data state in absence of applied power.

The antenna 508, adjustable impedance block 506, RF front end 504, memory 512, digital state machine 514, and analog block 516 communicate with each other through respective input/output (I/O) and/or control buses, or alternatively, a common I/O and/or common control bus may carry all such communications. Furthermore, the RF front end 504, energy storage device 510, memory 512, digital state machine 514, analog block 516 and optional DC power source 518 are coupled via respective power buses, or alternatively, are coupled via a common power bus. It should be appreciated that the adjustable impedance block 506, RF front end 504, energy storage device 510, analog block 516, digital state machine 514, and memory 512 may be provided by separate circuit elements, or may be sub-elements of a single mixed-signal integrated circuit, such as an application specific integrated circuit (ASIC), field programmable gate array (FPGA), or the like. Suitable antenna 508, RF front end 504, energy storage device 510, memory 512, digital state machine 514 and analog block 516 structures and operation are discussed in U.S. Patent Application 2003/0017804 and U.S. Pat. No. 6,812,841.

Figure 6:
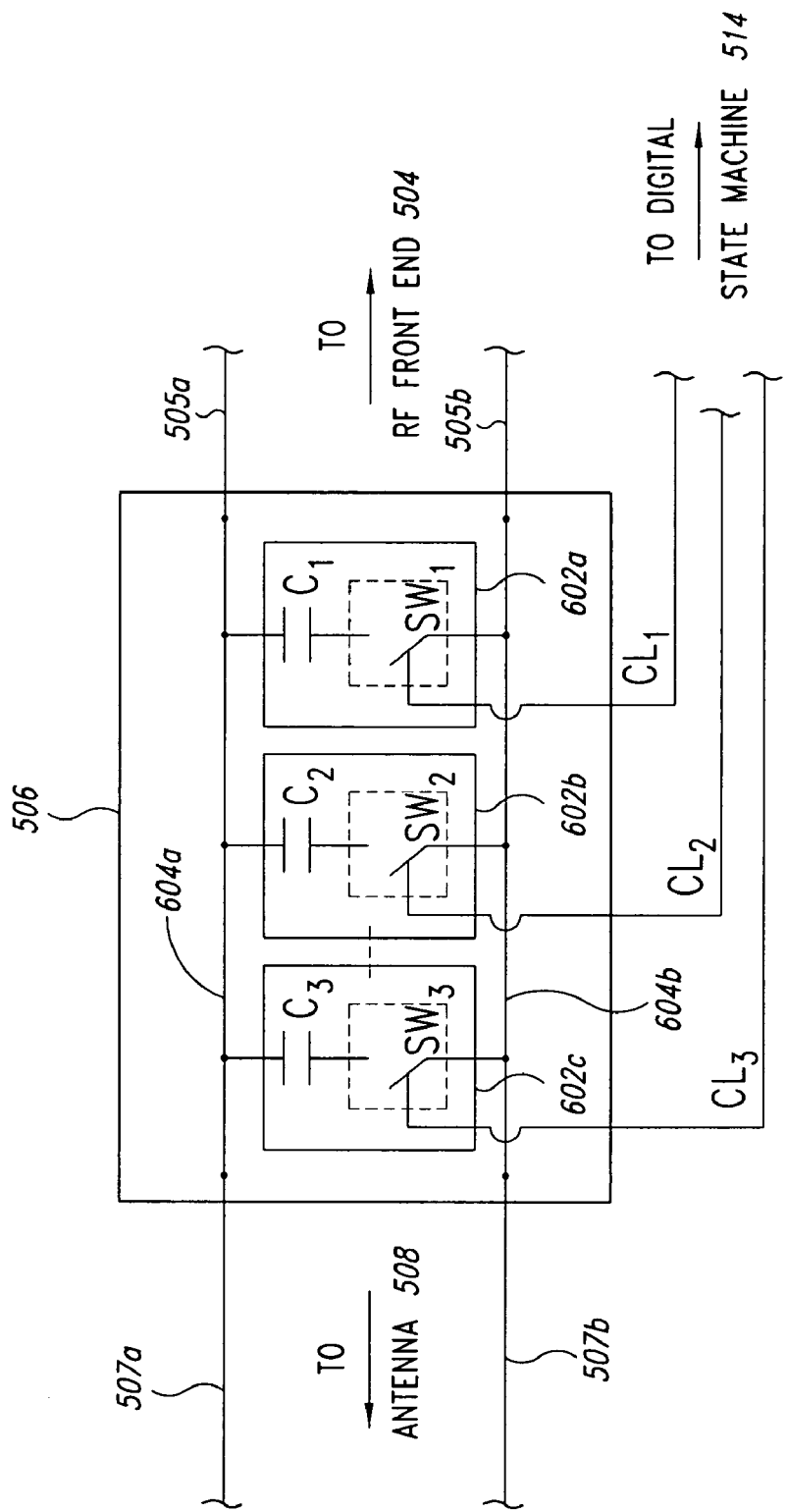
FIG. 6 is a block diagram of the adjustable impedance block of the RFID tag of FIG. 5, according to one illustrated embodiment.

FIG. 6 is a block diagram of the adjustable impedance block 506 of FIG. 5.

As illustrated in FIG. 6, the adjustable impedance block 506 may include a set of capacitors $C_1$, $C_2$ and $C_3$, and a set of associated switches $SW_1$, $SW_2$ and $SW_3$. Each capacitor is connected in series with an associated switch to form a switched capacitor 602. For example, switched capacitor 602a includes the capacitor $C_1$ connected in series with the switch $SW_1$, and switched capacitor 602b includes the capacitor $C_2$ connected in series with the switch $SW_2$. The switched capacitors 602a-602c are connected in parallel with each other between a line 604a and 604b. For ease of illustration, the adjustable impedance block 506 includes three switched capacitors 602a-602c, however, the scope of the invention includes other embodiments having any number of switched capacitors, including any number of capacitors and associated switches. Furthermore, the adjustable impedance block 506 may include switched transistors and/or other discrete or integrated circuit elements, such as switched resistors and inductors, for example.

In operation, the digital state machine 514 (FIG. 5) may set and/or change the resonant frequency of the RFID tag 304 (FIG. 5) by sending switch control signals via control lines $CL_1$, $CL_2$ and $CL_3$ that determine a state of each switch (i.e., OPEN or CLOSE). For example, a high voltage control signal may close a switch, thus coupling the associated capacitor into the RFID tag circuitry (i.e., the circuitry comprising the antenna 508, the RF front end 504 and the signal processing/memory section 502). A switch control signal having a low voltage may OPEN the switch, thus decoupling the associated capacitor from the RFID circuitry. In this manner, any combination of capacitors may be electrically coupled into the RFID tag circuitry, thereby adjusting and/or setting the impedance and the resonant frequency of the RFID tag 304.

In one embodiment, when the RFID tag 304 (FIG. 5) is initially powered-up or activated, the digital state machine 514 retrieves power-up instructions stored in the memory 512. Based upon the retrieved instructions, the digital state machine 514 sets an impedance of the adjustable impedance block 506 (and thus consequently defines an impedance and resonant frequency of the RFID tag 304) by sending control signals via control lines $CL_1$, $CL_2$ and $CL_3$ to set the state (e.g., OPEN or CLOSE) of switches $SW_1$, $SW_2$ and $SW_3$. In the embodiment as illustrated, the adjustable impedance block 506 may be set to $2^3$ different impedance values. The number of resonant frequencies available to an RFID tag 304 with n switched capacitors is $2^n$, where n is an integer greater than or equal to 1.

Figure 7:
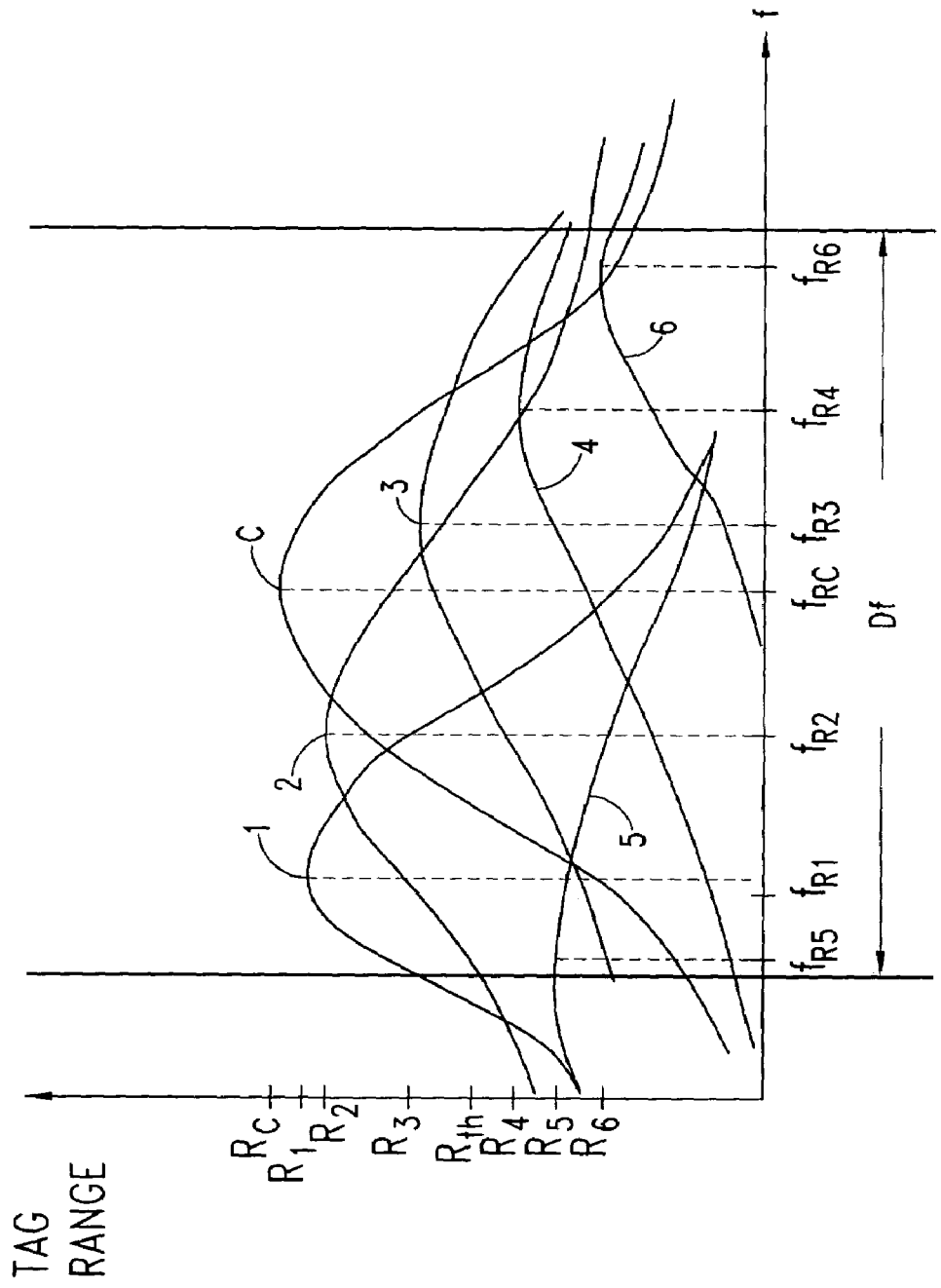
FIG. 7 is a graph showing exemplary curves of RFID tag range versus frequency for the RFID tag of FIG. 3, having seven different resonant frequencies, according to one illustrated embodiment.

FIG. 7 shows exemplary curves of RFID tag range versus frequency for the RFID tag 304 having seven different resonant frequencies defined by seven different impedance settings of the adjustable impedance block 506, according to an embodiment. For example, upon activation or power-up, the RFID tag 304 sets an impedance of the adjustable impedance block 506 to a first impedance value, thereby setting the resonant frequency of the RFID tag 304 to $f_{RC}$. Curve C illustrates the range of the RFID tag 304 having a resonant frequency of $f_{RC}$. Curves 1-6 illustrate the ranges of the RFID tag 304 for six other tag resonant frequencies $f_{R1}$-$f_{R6}$ given by six other impedance settings of the adjustable impedance block 506.

If the RFID tag resonant frequency is determined to be $f_{RC}$ when the system 300 powers-up, then the RFID reader 302 (FIG. 3) and the RFID tags 304 (FIG. 3) communicate using carrier waves of frequency $f_{RC}$. In other words, the RFID reader 302 sends interrogation RF signals and/or change frequency RF signals having a carrier frequency of $f_{RC}$, and the RFID tags 304 transmit response RF signals having a carrier frequency of $f_{RC}$. As mentioned above, the transmission or broadcast period (i.e., dwell time) during which the RFID reader 302 interrogates the tag population at a single carrier frequency may depend upon a FCC-defined maximum energy $E_{max}$ radiated by the RFID reader 302 at a single carrier frequency. That is, the RFID reader 302 may instruct the RFID tags 304 to switch to a new resonant frequency after a dwell time of $E_{max}/P$, where P is the power of the radiated interrogation RF signal. In another embodiment, the dwell time may be a predefined constant time interval, independent of the power of the interrogation RF signal. In yet another embodiment, the dwell time may depend upon the number of tags identified, or based upon a percentage of tags identified from an estimated tag population. The present invention also covers dwell times otherwise defined, including dwell times set by various FCC regulations or other governmental or non-governmental organizations such as standards organizations.

After a period of time equivalent to the dwell time has expired, the RFID reader 302 determines a new carrier wave frequency and transmits a frequency change command to the unidentified RFID tags 304 identifying the new carrier wave frequency and instructing the unidentified RFID tags 304 to change their tag resonant frequency to the new carrier wave frequency. In response, the RFID tags 304 adjust the impedance of the adjustable impedance block 506 such that the RFID tags 304 have a new tag resonant frequency equivalent to the new carrier wave frequency. For example, if the new carrier wave frequency is $f_{R2}$, the digital state machine 514 determines the impedance of the adjustable impedance block 506 based upon data (e.g., resonant frequency/impedance tables) stored in the memory 512. The digital state machine 514 then sets the voltage (or current) levels on control lines $CL_1$, $CL_2$ and $CL_3$ such that a different combination of capacitors are coupled to the RFID tag circuitry, thus changing the impedance of the adjustable impedance block 506, the impedance of the RFID tag 304, and the resonant frequency of the RFID tag 304. Curve 2 shows the expected range of the RFID tag 304 having the resonant frequency $f_{R2}$, and as illustrated, the range of the unidentified RFID tags 304 is $R_2$.

Similarly, after another dwell time has expired, the RFID reader 302 sends another change frequency RF signal, identifying another new carrier wave frequency and instructing the remaining unidentified RFID tags 304 to change their resonant frequency to the new carrier wave frequency. The RFID reader 302 hops to a plurality of frequencies within the bandwidth $\Delta f$, and for each hop in carrier frequency, the RFID reader 302 sends a change frequency RF signal instructing the remaining unidentified RFID tags 304 to adjust the impedance of the adjustable impedance block 506, thus changing the resonant frequency of each RFID tag 304 to the new carrier wave frequency.

Figure 8:
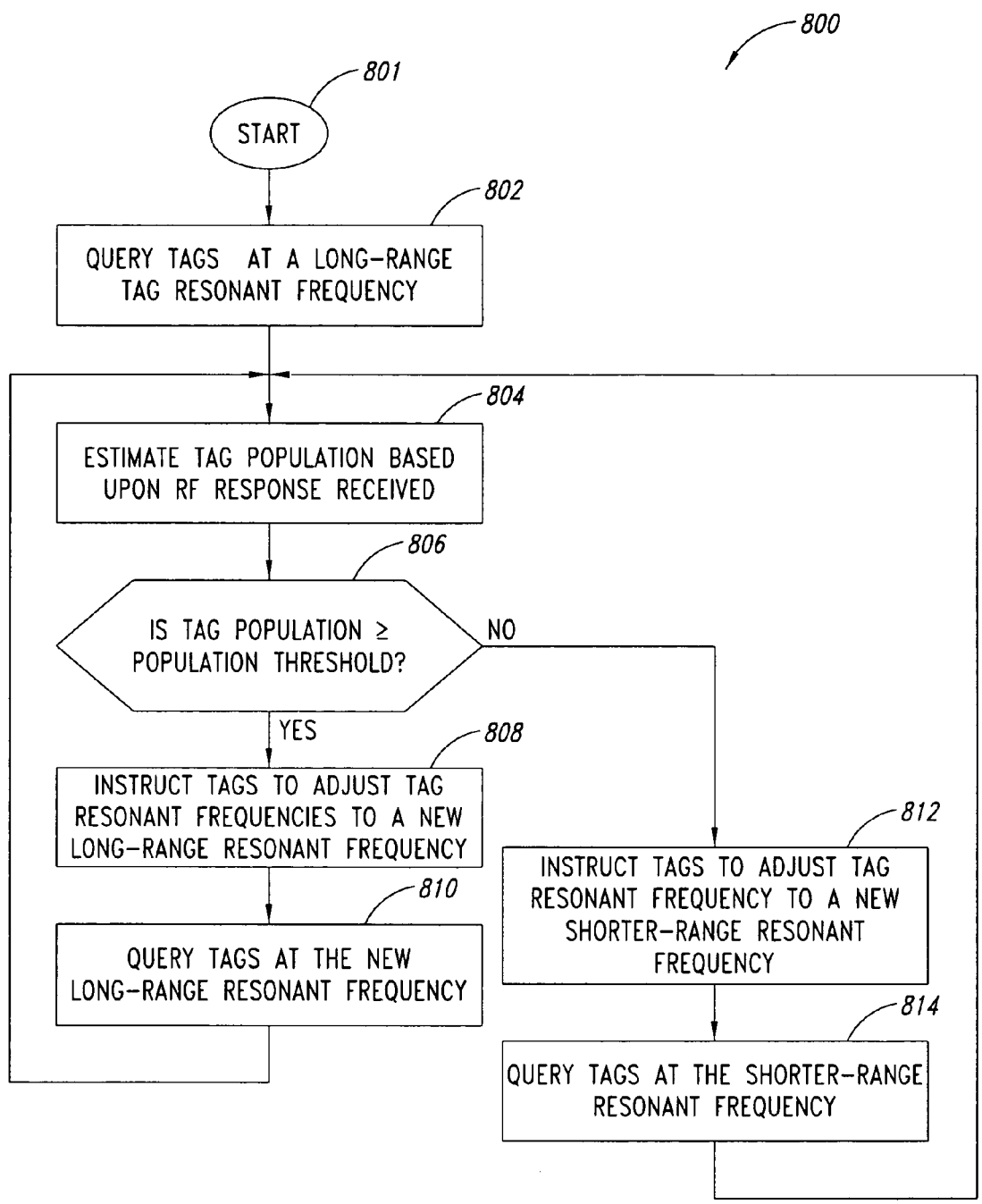
FIG. 8 is a flow diagram of a method of selecting carrier wave frequencies and modifying tag resonant frequencies to match the selected carrier wave frequencies, according to one illustrated embodiment.

FIG. 8 is a flow diagram of a method 800 of selecting carrier wave frequencies and modifying tag resonant frequencies to match the selected carrier wave frequencies, according to an embodiment.

Briefly stated, by only hopping to carrier wave frequencies (also referred to as carrier frequencies) equal to long-range tag resonant frequencies (i.e., resonant frequencies with ranges greater than a predefined range threshold $R_{th}$, for example) when the RFID tag population is greater than or equal to a predefined population threshold, and only hopping to carrier frequencies equal to smaller-range tag resonant frequencies when the RFID tag population is less than the predefined population threshold, the rate of RFID tag identification is increased. That is, RFID system throughput is increased when for large RFID tag populations the carrier frequency is equal to one of the long-range tag resonant frequencies, and for smaller RFID tag populations the carrier frequency is equal to one of the smaller-range tag resonant frequencies. The long-range tag resonant frequencies form a first subset of available carrier frequencies, and the shorter-range tag resonant frequencies form a second subset of available carrier frequencies. When the unidentified RFID tag population changes, for example through population dynamics (e.g., more unidentified RFID tags leave the range of an RFID reader than new tags enter the range of the RFID reader) or through RFID tag identification, system efficiency and throughput may be optimized by selecting a frequency hopping order based upon the unidentified RFID tag population size.

Referring back to FIG. 7, the resonant RFID tag frequencies $f_{RC}$, $f_{R1}$, $f_{R2}$ and $f_{R3}$ are long-range tag resonant frequencies forming the first subset of available carrier frequencies, since RFID tags having these resonant frequencies have tag ranges Rc, $R_1$, $R_2$ and $R_3$ greater than $R_{th}$. The resonant RFID tag frequencies $f_{R4}$, $f_{R5}$ and $f_{R6}$ are shorter-range tag resonant frequencies forming the second subset of available carrier frequencies, since RFID tags having these resonant frequencies have tag ranges $R_4$, $R_5$ and $R_6$ less than $R_{th}$.

The method starts at 801. At 802, the RFID reader 302 (FIG. 3) queries a population of RFID tags 304 using an interrogation RF signal having a carrier frequency equal to a long-range tag resonant frequency. The power-up tag resonant frequency may be the center frequency $f_{RC}$ of the operable band (see FIG. 7) and is typically a long-range tag resonant frequency. For example, if the RFID tag population is factory-configured to operate in a 30 MHz bandwidth centered around 915 MHz, the power-up resonant frequency of the RFID tags 304 may be 915 MHz. The RFID tags 304 that receive the interrogation RF signal from the RFID reader 302 transmit modulated response RF signals at the long-range power-up tag resonant frequency.

At 804, the RFID reader 302 receives the response RF signals, where the number of response RF signals may be less than the number of response RF signals sent by the RFID tags 304. The RFID reader 302 then estimates the RFID tag population based upon the number of received responses. The RFID reader 302 may use additional information, such as object identification information embedded in the received response RF signals, strength of the response RF signal, or information associated with the identified objects stored in memory 410 to estimate the size of the RFID tag population.

At 806, the RFID reader 302 compares the estimated tag population with a predefined population threshold. If the estimated RFID tag population is greater than or equal to the population threshold, then the RFID reader 302 transmits a change frequency RF signal that instructs the unidentified RFID tags 304 to adjust their resonant frequencies to a new long-range tag resonant frequency at 808. For example, the new long-range tag resonant frequency may be any resonant frequency having a range greater than a threshold range $R_{th}$, such as resonant frequencies $f_{R1}$, $f_{R2}$ and $f_{R3}$ (FIG. 7). In order to adjust their resonant frequencies, the RFID tags 304 adjust an impedance of the adjustable impedance block 506 (FIG. 5) based upon instructions sent by the RFID reader 302.

At 810, the RFID reader 302 queries the unidentified RFID tag population at the new long-range tag resonant frequency (i.e., using an interrogation RF signal having a carrier frequency equal to the new long-range tag resonant frequency). The unidentified RFID tags 304 that receive the interrogation RF signal at the new long-range tag resonant frequency transmit modulated response RF signals at the new long-range tag resonant frequency. For example, if the RFID reader 304 queries the unidentified RFID tag population at the new long-range tag resonant frequency $f_{R2}$, the RFID tags respond with a modulated response RF signal at the frequency $f_{R2}$, giving the responding RFID tags 304 a range $R_2$. The method continues at 804.

However, if at 806 the RFID tag population is less than the population threshold, then the RFID reader 302 transmits a change frequency RF signal that instructs the unidentified RFID tags 304 to adjust their tag resonant frequencies to a shorter-range tag resonant frequency at 812. For example, the shorter-range tag resonant frequency may be any resonant frequency having a range less than the threshold range $R_{th}$, such as resonant frequencies $f_{R4}$, $f_{R5}$ and $f_{R6}$ (FIG. 7). In order to adjust their resonant frequencies, the RFID tags 304 adjust an impedance of the adjustable impedance block 506 based upon the instructions sent by the RFID reader 302.

Next, at 814, the RFID reader 302 queries the unidentified RFID tag population at the shorter-range tag resonant frequency. The unidentified RFID tags 304 that receive the interrogation RF signal at the shorter-range tag resonant frequency respond with a modulated response RF signal at the shorter-range tag resonant frequency. For example, if the RFID reader 302 queries the unidentified RFID tag population at the shorter-range frequency $f_{R6}$, the RFID tags 304 respond with a modulated RF signal at the frequency $f_{R6}$, giving the RFID tags a range $R_6$. The method then continues at 804.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other RFID systems, readers and tags, not necessarily the exemplary RFID systems, readers and tags generally described above. For example, the system and methods may turn-off RFID tags for a defined period off time, in order to successfully poll the RFID tag population. Also for example, the system and methods may operate in portions of the electromagnetic spectrum other than that portion typically identified as being the radio wave portion. An example of such may include the portion typically identified as the microwave portion. Thus, as used herein and in the claims, the term radio frequency or RF means any portion of the electromagnetic spectrum useful in providing wireless communications.

Also for example, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., digital signal processors, microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Pat. Nos. 5,828,693; 5,850,181; and 6,812,841; and U.S. Patent Application Publication Nos. 2003/0017804; and 2005/0179521, are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all RFID readers, tags or transponders and/or systems having structure or that operate in accordance with the claims. Accordingly, the invention is not limited by the disclosure, but instead its scope is to be determined entirely by the following claims.

The invention claimed is:

1. A radio frequency identification reader operable to communicate with RFID tags, the radio frequency identification reader comprising:
   a reader antenna;
   a variable radio frequency source operable to generate carrier waves at a plurality of carrier wave frequencies;
   a controller operable to from time-to-time, determine a new carrier wave frequency, the new carrier wave frequency being different from a current carrier wave frequency that at least approximately matches a current tag resonant frequency of at least one of the RFID tags, and generate change frequency instructions indicative of an instruction to change a tag resonant frequency from the current tag resonant frequency to at least approximately match a new tag resonant frequency; and
   a transmitter configured to modulate the carrier waves having the current carrier wave frequency with the change frequency instructions to transmit a change frequency radio frequency signal via the reader antenna.

2. The radio frequency identification reader of claim 1 wherein the change frequency radio frequency signal encodes the new tag resonant frequency.

3. The radio frequency identification reader of claim 1, further comprising:
   a receiver to receive response radio frequency signals transmitted by the plurality of radio frequency identification tags.

4. The radio frequency identification reader of claim 3 wherein the controller is further operable to determine the new carrier wave frequency based upon the received response radio frequency signals.

5. The radio frequency identification reader of claim 3 wherein the controller is operable to estimate a radio frequency identification tag population based upon a number of the received response radio frequency signals and to determine the new carrier wave frequency based upon the estimated radio frequency identification tag population.

6. The radio frequency identification reader of claim 5 wherein the new carrier wave frequency is selected from a first subset of frequencies of the plurality of carrier wave frequencies when the estimated tag population is at least equal to a predefined population threshold, the first subset of frequencies including long-range tag resonant frequencies.

7. The radio frequency identification reader of claim 5 wherein the new carrier wave frequency is selected from a second subset of frequencies of the plurality of carrier wave frequencies when the estimated tag population is less than a predefined population threshold, the second subset of frequencies including shorter-range tag resonant frequencies.

8. The radio frequency identification reader of claim 1 wherein the variable radio frequency source is a voltage-controlled oscillator.

9. The radio frequency identification reader of claim 1 wherein the controller is a microprocessor.

10. The radio frequency identification reader of claim 1 wherein the controller is operable to change an impedance of the reader antenna to at least approximately match the new tag resonant frequency after the change frequency radio frequency signal is transmitted via the reader antenna.

11. A method of operating a radio frequency identification reader to enhance radio frequency identification tag identification rates for a plurality of radio frequency identification tags operating at a variable tag resonant frequency, the method comprising:
   interrogating the plurality of radio frequency identification tags at a current tag resonant frequency for a dwell time;
   receiving response radio frequency signals transmitted by the plurality of radio frequency identification tags at the tag resonant frequency during the dwell time;
   determining a new tag resonant frequency at which the radio frequency identification tags and the radio frequency identification reader will communicate; and
   transmitting a change frequency radio frequency signal for instructing the radio frequency identification tags to change the tag resonant frequency to the new tag resonant frequency.

12. The method of claim 11 wherein transmitting a change frequency radio frequency signal for instructing the radio frequency identification tags to change the tag resonant frequency to the new tag resonant frequency comprises transmitting the change frequency radio frequency signal encoding the new tag resonant frequency.

13. The method of claim 11, wherein determining the new tag resonant frequency further comprises:
   determining the new tag resonant frequency based upon the received response radio frequency signals.

14. The method of claim 11, further comprising:
   estimating a radio frequency tag population based upon a number of the received response radio frequency signals.

15. The method of claim 14 wherein determining the new tag resonant frequency further comprises determining the new tag resonant frequency based upon the estimated radio frequency identification tag population.

16. The method of claim 15 wherein the new tag resonant frequency is selected from a first subset of carrier frequencies when the estimated radio frequency identification tag population is at least equal to a predefined population threshold, the first subset of carrier frequencies including long-range tag resonant frequencies.

17. The method of claim 15 wherein the new tag resonant frequency is selected from a second subset of carrier frequencies when the estimated radio frequency identification tag population is less than a predefined population threshold, the second subset of carrier frequencies including shorter-range tag resonant frequencies.

18. The method of claim 11, further comprising:
determining the dwell time based upon the received response radio frequency signals.

19. A method of operating a radio frequency identification tag in communication with a radio frequency identification reader to enhance radio frequency identification tag identification rates, the method comprising:
receiving a radio frequency signal from the radio frequency identification reader;
determining whether the received radio frequency signal is an instruction to change a tag resonant frequency of the radio frequency identification tag; and
changing a tag resonant frequency to a new tag resonant frequency in response to determining that the received radio frequency signal is an instruction to change the tag resonant frequency of the radio frequency identification tag.

20. The method of claim 19 wherein changing a tag resonant frequency to a new tag resonant frequency comprises adjusting an impedance of an adjustable impedance block.

21. The radio frequency identification tag of claim 20 wherein adjusting an impedance of an adjustable impedance block comprises selectively electrically coupling at least one of a plurality of switched capacitors in parallel across an antenna of the radio frequency identification tag.

22. The method of claim 19 wherein changing a tag resonant frequency to a new tag resonant frequency comprises adjusting an impedance of an adjustable impedance block according to a value encoded in the received radio frequency signal that is determined to be an instruction to change the tag resonant frequency to a new tag resonant frequency.

* * * * *